(12) United States Patent
Strohmayr et al.

(10) Patent No.: US 12,352,640 B2
(45) Date of Patent: Jul. 8, 2025

(54) TACTILE SENSOR ELEMENT (71) Applicant: Tacterion GmbH, Munich (DE)

(72) Inventors: Michael Wolfgang Strohmayr, Augsburg (DE); Alaa Abdellah, Munich (DE)

(73) Assignee: TACTERION GMBH, Munich (DE)

( * ) Notice: Subject to any disclaimer, the term of this patent is extended or adjusted under 35 U.S.C. 154(b) by 447 days.

(21) Appl. No.: 17/611,446

(22) PCT Filed: May 26, 2020

(86) PCT No.: PCT/EP2020/064562
§ 371 (c)(1),
(2) Date: Nov. 15, 2021

(87) PCT Pub. No.: WO2020/239758
PCT Pub. Date: Dec. 3, 2020

(65) Prior Publication Data
US 2022/0236121 A1 Jul. 28, 2022

(30) Foreign Application Priority Data
May 27, 2019 (DE) .................. 10 2019 114 185.0

(51) Int. Cl.
*G01L 1/20* (2006.01)
*G01L 1/14* (2006.01)
(52) U.S. Cl.
CPC .............. *G01L 1/205* (2013.01); *G01L 1/146* (2013.01)
(58) Field of Classification Search
CPC ................................ G01L 1/205; G01L 1/146
(Continued)

(56) References Cited

U.S. PATENT DOCUMENTS

2005/0072249 A1  4/2005  Maeda et al.
2010/0077868 A1  4/2010  Joung
2019/0113410 A1*  4/2019  Yoo .......................... G01L 9/06

FOREIGN PATENT DOCUMENTS

CN  103838445 A  *  6/2014  ............. G06F 3/041
DE  19533756 A1  3/1997
GB  2343516 A  5/2000

OTHER PUBLICATIONS

CN103838445 (Year: 2014).*
(Continued)

*Primary Examiner* — Peter J Macchiarolo
*Assistant Examiner* — Rodney T Frank
(74) *Attorney, Agent, or Firm* — HOFFMANN & BARON, LLP (57) ABSTRACT

A tactile sensor element including: a substrate of non-conductive material; an electrode layer ES1 applied onto an upper face of the substrate layer; an electrode layer ES2 applied onto the upper face of the substrate layer, the electrode layers consisting of conductive material, arranged on the upper face in a spaced manner, and having respective shapes such that sub-regions of electrode layer ES1 and sub-regions of electrode layer ES2 alternate in a region on the upper face along a direction R0; a spacer layer applied onto the substrate layer with the applied electrode layers, the spacer layer consisting of spaced sections running in a direction R1 and consisting of a substantially non-conductive material or a perforated grating made of this material with grating axes running parallel to the upper face, in the region; and a measurement layer applied onto the spacer layer and consisting of conductive, elastic, and stretchable material.

24 Claims, 5 Drawing Sheets

103a  103b  103c  103d (58) Field of Classification Search
USPC .................................................. 73/862.621
See application file for complete search history.

(56) References Cited

OTHER PUBLICATIONS

English-language translation of International Preliminary Report on Patentability issued in International Application No. PCT/EP2020/064562 on Dec. 9, 2021.

* cited by examiner

TACTILE SENSOR ELEMENT

CROSS-REFERENCE TO RELATED APPLICATIONS

The present application is the U.S. National Phase of PCT/EP2020/064562, filed on 26 May 2020, which claims priority to German Patent Application No. 10 2019 114 185.0, filed on 27 May 2019, the entire contents of which are incorporated herein by reference.

FIELD

The invention relates to a tactile sensor element and a tactile sensor including such a tactile sensor element.

SUMMARY

The object of the invention is to provide an improved, robust, and versatile tactile sensor element and a tactile sensor including such a sensor element, which is also easy to manufacture.

The invention is defined by the features of the independent claims. Advantageous further refinements and embodiments are the subject of the dependent claims. Further features, potential applications, and advantages of the invention result from the following description and from the explanation of embodiments of the invention, which are shown in the drawings.

A first aspect of the invention relates to a tactile sensor element including: a substrate layer made of an electrically non-conductive material M1; a first electrode layer ES1 which is applied onto the upper face of the substrate layer, and a second electrode layer ES2 which is applied onto the upper face of the substrate layer, wherein the first layer ES1 and the second electrode ES2 consist of an electrically conductive material M2, are arranged on the upper face in a laterally spaced manner, and have respective 2D shapes designed such that sub-regions of the electrode layer ES1 and sub-regions of the electrode layer ES2 alternate successively multiple times at least in one region B on the upper face along a direction R0; a spacer layer which is applied onto the substrate layer with the electrode layers ES1 and ES2 applied thereon, the spacer layer consisting of individual (advantageously straight) sections ST, which run (advantageously in parallel) in the direction R1 and are mutually spaced and which consist of a substantially electrically non-conductive material M3, or a perforated grating made of the substantially electrically non-conductive material M3 with grating axes G1 and G2 running parallel to the upper face, at least in the region B; and a measurement layer which is applied onto the spacer layer (advantageously in a closed manner over a large area) and consists of an electrically conductive elastic and stretchable material M4.

The wording "substantially electrically non-conductive" characterizes in the present case materials that have a very high/high electrical resistance and are therefore usually referred to as "electrical insulator material" or "electrical insulators" in technical practice.

The proposed tactile sensor element thus basically includes the four layers arranged directly on top of one another: Substrate layer (bottom layer, first layer), electrode layers ES1 and ES2 (second layer) which are applied laterally offset in one plane, spacer layer which is applied thereon (third layer), and measurement layer which is applied onto the spacer layer (top layer, fourth layer of the tactile sensor element).

A further, fifth layer (protective layer), which fulfills a protective function, is advantageously applied onto the measurement layer. The protective layer is made of an electrically non-conductive material M5. The protective layer advantageously consists of an elastomer material.

The material M1, particularly polyethylene, is advantageously polyethylene terephthalate PET. This is advantageously chosen for applications in which the sensor element should have flexible and bendable material properties overall but should not be stretchable.

On the other hand, if the sensor element is to have elastic material properties overall, i.e., to be slightly stretchable, an elastomer, in particular silicone, is advantageously used for the material M1.

The material M2 is preferably silver or a silver alloy. Alternatively, the material M2 can be gold or a gold alloy or copper or a copper alloy. In an advantageous development, the material M2 is an electrically conductive elastically deformable plastics material or an elastomer.

The material M3 is preferably a dielectric material, i.e., in practice "electrically non-conductive."

The material M4 is preferably an elastomer material.

An advantageous development of the proposed sensor element is characterized in that all materials: M1, M2, M3, M4, and M5 (if any) are stretchable and elastically deformable. Such an embodiment of the sensor element is particularly suitable for application/attachment to uneven surfaces.

An advantageous embodiment of the proposed sensor element is characterized in that the sub-regions of the electrode layers ES1 and ES2 alternating along the direction R0 in the region B are each designed as projections, for example, as bar-like projections or jagged projections, the projections of the electrode layers ES1 and ES2 interlocking in a comb-like manner. The region B is the region in which tactile inputs, i.e., the approach of objects to the proposed sensor element, can be detected in a capacitive evaluation mode, as well as forces actually exerted on the sensor element.

The proposed sensor element is advantageously designed in such a way that the region B represents a largest part of the sensor surface of the sensor element (for example >80% of the surface of the sensor element).

The sub-regions of the electrode layers ES1 and ES2 arranged successively on the surface of the substrate layer in the direction R0 advantageously have a corresponding distance from one another in a range of 0.01 mm to 5.0 mm.

The sub-regions of the electrode layers ES1 and ES2 arranged successively on the surface of the substrate layer in the direction R0 advantageously have a corresponding longitudinal extension in the direction R0, in a range of 0.01 mm to 5.0 mm. In other words, this specifies the corresponding width of the sub-regions of the electrode layers ES1 and ES2 alternating in the direction R0.

The direction R1 and the direction R0 particularly advantageously enclose an angle $\alpha$, wherein $\alpha$ is in the angular range of 30° to 60°. The direction R1 and the direction R0 preferably enclose an angle $\alpha=45°$.

The direction R0 and one of the grating axes G1, G2 particularly advantageously enclose an angle $\alpha$, wherein $\alpha$ is in the angular range of 30° to 60°. The direction R0 and one of the grating axes G1, G2 preferably enclose an angle $\alpha=45°$.

In a preferred embodiment, the sub-regions (sections ST) of the electrode layers ES1 and ES2 are shaped in such a way that they each have comb-tooth-like projections, for example, bar-shaped or tooth-shaped, and which are arranged parallel to one another, interlocking without touching one another on the substrate layer, analogous to two combs, the prongs of which engage in the interstices of the prongs of the corresponding opposing combs, but without touching each other.

An advantageous development of the proposed sensor element is characterized in that the sections ST of the sub-regions of the electrode layers ES1 and ES2 have a corresponding constant distance from one another in the region B. The sensor characteristic (for example, sensor resolution) is therefore constant in the region B.

Depending on the application, it may be necessary to vary the sensor characteristics over the region B. Such a configuration of the proposed sensor element is characterized in that the sections ST of the sub-regions of the electrode layers ES1 and ES2 have a corresponding varying distance D from one another in the region B. Alternatively or additionally, the corresponding width of the sub-regions of the electrode layers ES1 and ES2 alternating in the direction R0 is advantageously varied over the region B. This also results in a sensor characteristic that varies over the region B.

An advantageous development of the proposed sensor element is characterized in that the first electrode layer ES1 is designed as a plurality of spaced apart, electrically connected concentric ring segments RES1 and the second electrode layer ES2 is designed as a plurality of spaced apart, electrically connected concentric ring segments RES2, the ring segments RES1 and RES2 being arranged alternately in the direction R0. In contrast to the parallel sections ST of the development described above, the sections in this development are circular, i.e., designed as circular segments or completely closed ring segments. In this case, ring segments of the first electrode layer ES1 alternate with ring segments of the second electrode layer ES2 along the direction R0.

The sub-regions of the electrode layers ES1 and ES2 in region B, which alternate successively in the direction R0, can generally be shaped as desired.

The spacer layer and the measurement layer are designed and set up in such a way that, when a force is applied onto the measurement layer, the measurement layer electrically contacts the electrode layers ES1 and ES2 which run between the sections ST or below the perforations of the perforated grating by elastic deformation. The measurement layer has corresponding elastic properties for this purpose, such that by applying a force, on the one hand, it is elastically deformed by a person in such a way that it is able to make electrical contact with the sub-regions of the electrode layers ES1 and ES2 and return to the original position after the force input has ended. The spacer layer, on the other hand, is made sufficiently stiff so that, if the force input onto the measurement layer does not take place, i.e., when the measurement layer is not under load, a sufficient distance is created between the measurement layer and the sub-regions of the electrode layers ES1 and ES2 arranged in the interstices of the spacer layer.

Contacting the respective sub-regions of the electrode layers ES1 and ES2 locally results in an electrical connection between the first electrode layer ES1 and the second electrode layer ES2 via the local measurement layer. If the electrode layers ES1 and ES2 are each connected to a voltage source or a current source, a current flow can thereby be measured which indicates a corresponding tactile force input into the sensor element.

The sub-regions of the electrode layers ES1 and ES2 and the spacer layer attached to them are advantageously matched to one another in such a way that at least two sub-regions of the electrode layers ES1 and ES2 run in the interstices of the spacer layer, so that they can be electrically contacted by pressing down the measurement layer.

An advantageous development of the proposed sensor element is characterized in that the measurement layer has a flat surface on its side facing the spacer layer.

A particularly advantageous development of the proposed sensor element is characterized in that the measurement layer has a surface structuring on its side facing the spacer layer. The surface structuring is advantageously made of the same material as the measurement layer itself. The surface structuring is advantageously characterized in that it has straight elevations arranged in parallel. Elevations of the measurement layer that are arranged next to one another can advantageously have an alternating rectangular and triangular cross section. Elevations arranged next to one another can advantageously each have a different elevation height H. The elevations with a rectangular cross section advantageously have a resulting height H1 and the elevations with the triangular cross section have an elevation height H2, where: $H2 \leq H1$.

With appropriate control and evaluation of the electrode layers ES1 and ES2, the proposed sensor element allows both resistive and capacitive detection of tactile inputs into the sensor element. Depending on the specific design of the sub-regions of the electrode layers ES1 and ES2 alternating in the direction R0, the specific design of the spacer layer and the specific design of the measurement layer, the sensor element can be adapted to a large number of requirements and tasks. The sensor element can be produced with different elastic properties depending on the choice of materials M1 to M5.

A second aspect of the invention relates to a tactile sensor with a sensor element as described above and a control and evaluation module that is electrically connected to the first electrode layer ES1 and the second electrode layer ES2.

The control and evaluation module serves on the one hand as a voltage or current source for the electrode layers ES1 and ES2. If the electrode layers ES1 and ES2 are electrically connected to one another locally (at the respective successive sub-regions), for example, by the depressed measurement layer, this is correspondingly detected by the control and evaluation module and advantageously provided as a signal for further processing.

Further advantages, features and details can be derived from the following description, in which—with reference to the drawings, if necessary—at least one embodiment is described in detail. Identical, similar, and/or functionally identical parts are denoted with the same reference numerals.

DETAILED DESCRIPTION

Figure 1:
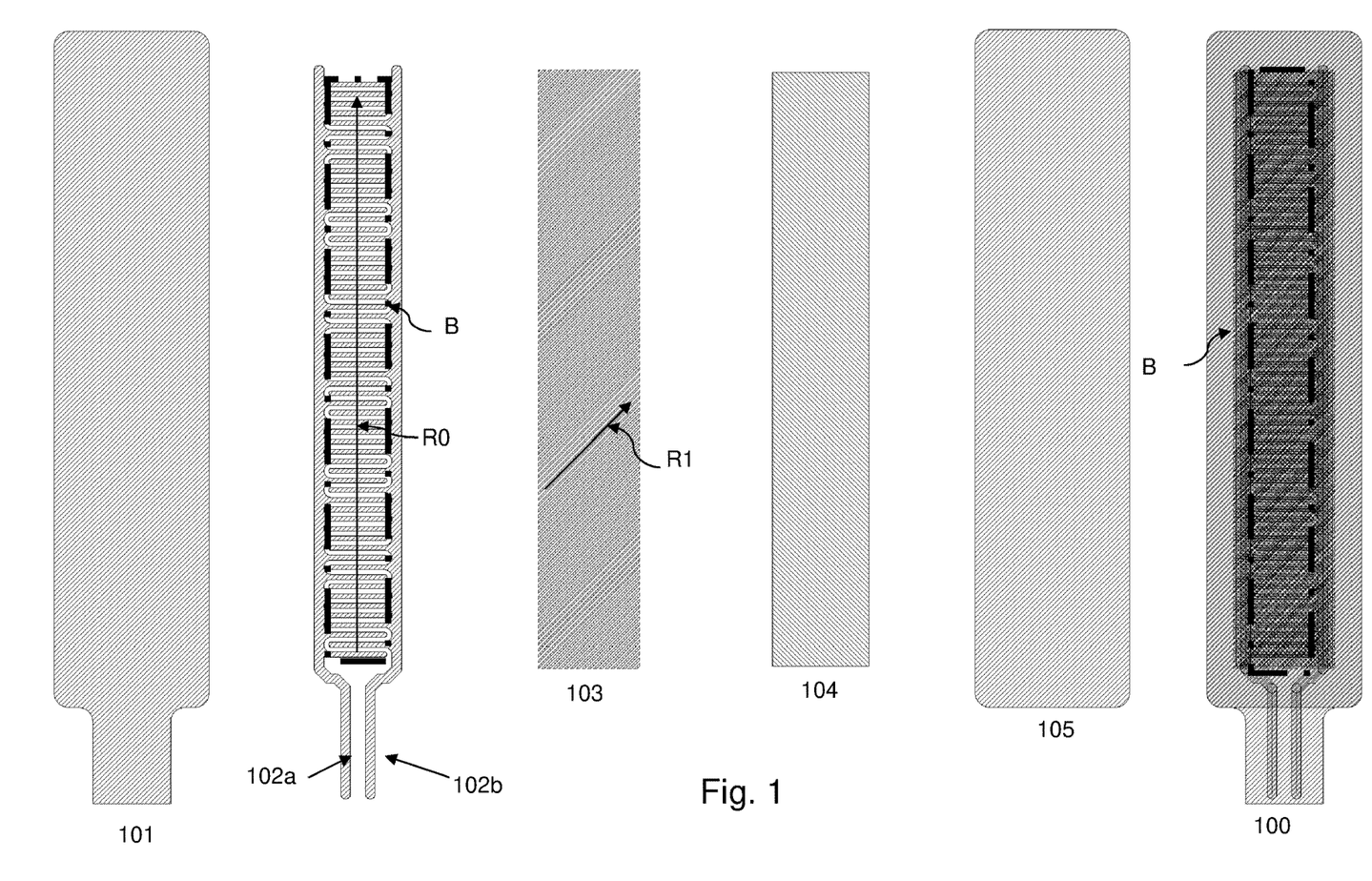
FIG. 1 is a schematic representation of a tactile sensor element according to the invention with its composition of layers.

FIG. 1 shows a schematic illustration of a tactile sensor element 100 according to the invention. The individual layers of the sensor element 100 are also shown schematically. In this embodiment, the sensor element 100 includes a substrate layer 101 made of the electrically non-conductive material M1: Polyethylene terephthalate PET, a first electrode layer ES1 102a which is applied onto the upper face of the substrate layer 101 and a second electrode layer ES2 102b which is applied onto the upper face of the substrate layer 101, wherein the first electrode layer ES1 and the second electrode layer ES2 consist of the electrically conductive material M2: silver Ag, are arranged on the upper face in a laterally spaced manner, and have respective 2D shapes designed such that sub-regions of the first electrode layer ES1 and sub-regions of the second electrode layer ES2 alternate successively multiple times at least in one region B on the upper face along a direction R0. In the present case, the sub-regions of the electrode layers ES1 and ES2 are designed in a comb-like manner, the prongs of the comb interlocking in the respective gaps between the prongs. The sub-regions of the electrode layers ES1 and ES2 have a constant distance from one another in the region B.

The sensor element 100 furthermore includes a spacer layer 103 which is applied onto the substrate layer 101 with the electrode layers ES1 and ES2 applied thereon, the spacer layer 103 consisting in the present case of individual straight sections ST, which run parallel in the direction R1 and are mutually spaced and which consist of an electrically non-conductive dielectric material M3, in the region B. The direction R0 and R1 enclose an angle of 45° in the present case.

The sensor element 100 furthermore includes a measurement layer 104 made of an electrically conductive elastic and stretchable material M4, which is applied onto the spacer layer 103 in a closed manner over a large area. The measurement layer 104 has a surface structuring on its side facing the spacer layer 103. In the present case, the surface structuring has straight elevations arranged in parallel, the elevations arranged next to one another alternately having a rectangular and a triangular cross section.

The sensor element 100 finally has a protective layer 105 applied onto the measurement layer 104.

Figure 2:
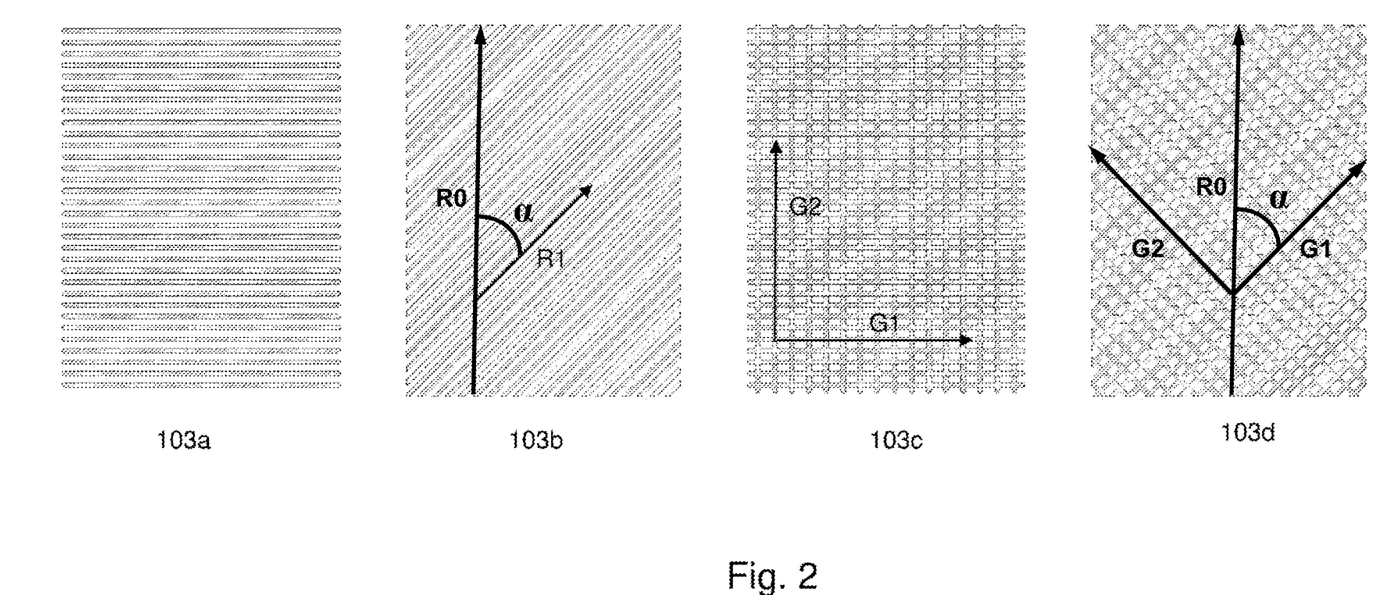
FIG. 2 shows various embodiments of the spacer layer.

FIG. 2 shows various embodiments of the spacer layer 103. The spacer layer 103a consists of horizontally extending sections ST, the spacer layer 103b consists of sections ST extending at a 45° angle, the spacer layer 103c consists of a right-angled grating with the grating axes G1, G2 and the spacer layer 103d is characterized by a rotation of the grating of 103c by 45°, each oriented on a horizontal line of the illustrated sheet.

For the sake of simplicity of illustration, the protective layer 105 has been omitted in FIGS. 3a, 3b to FIGS. 6a, 6b.

Figure 3A:
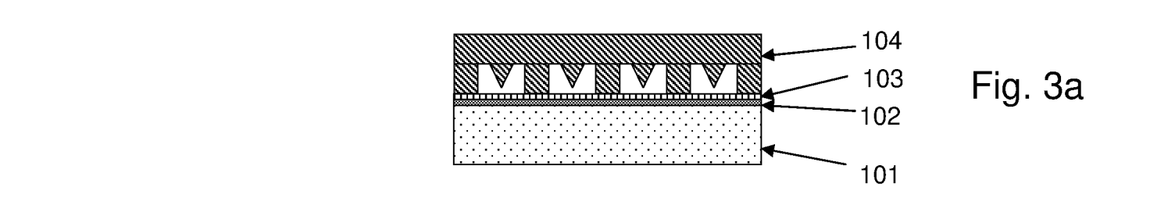
FIGS. 3a and 3b are schematic representations of a cross section (perpendicular to the direction R0) through a sensor element according to the invention, in which the measurement layer has a structure on the underside, in a relaxed state (FIG. 3a) and in a state in which a force is exerted on the sensor element (FIG. 3b)
Figures 3B, 4A:
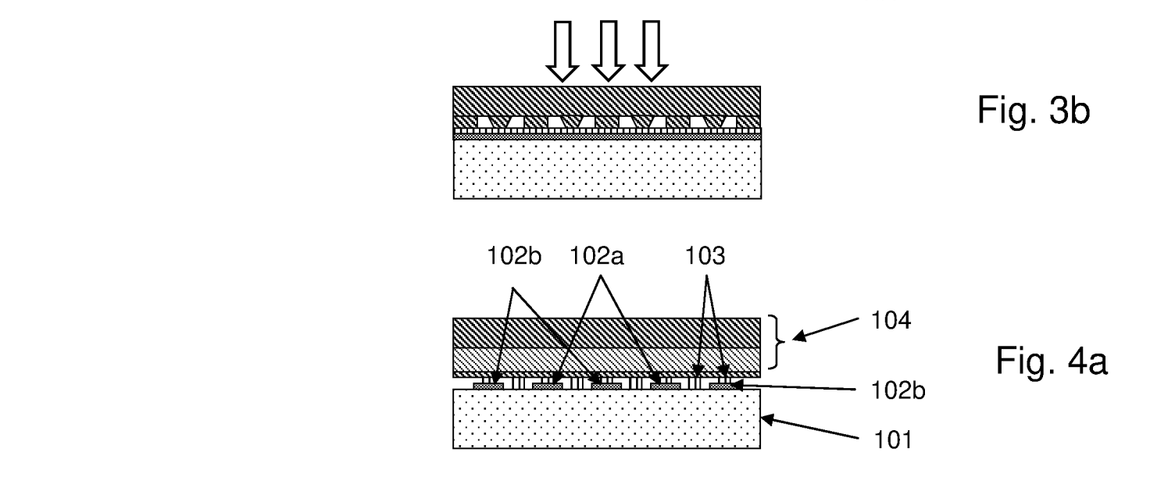
FIGS. 4a and 4b are schematic representations of a longitudinal section (in the direction R0) through the sensor element of FIGS. 3a and 3b in a relaxed state (FIG. 4a) and in a state in which a force is exerted on the sensor element (FIG. 4b)

FIGS. 3a and 3b are schematic representations of a cross section (perpendicular to the direction R0) through a sensor element 100 according to the invention, in which the measurement layer 104 has a structure on the underside, in a relaxed state (FIG. 3a) and in a state in which a force (indicated by the vertical arrows pointing downwards) is exerted on the sensor element 100 from above (FIG. 3b).

Figure 4B:
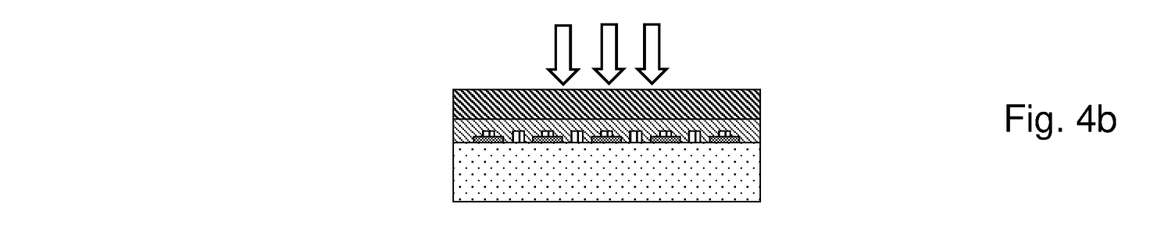

FIGS. 4a and 4b are schematic representations of a longitudinal section (in the direction R0) through the sensor element of FIGS. 3a, 3b in a relaxed state (FIG. 4a) and in a state in which a force is exerted on the sensor element (FIG. 4b). In the state of FIG. 4b, the electrically conductive measurement layer 104 is pressed onto the electrically conductive sub-regions of the electrode layers ES1 and ES2. This results in an electrical connection between sub-regions of the electrode layers ES1 and ES2, which can be recognized by a corresponding control and evaluation module 106. Appropriate evaluation allows both resistive and capacitive changes in parameters to be detected (changes in capacitive parameters as soon as objects approach the sensor element, changes in resistive parameters when electrical contact is made with sub-regions of the electrode layers ES1 and ES2). The measurement layer 104 is advantageously applied in a closed manner over a large area.

Figure 5A:
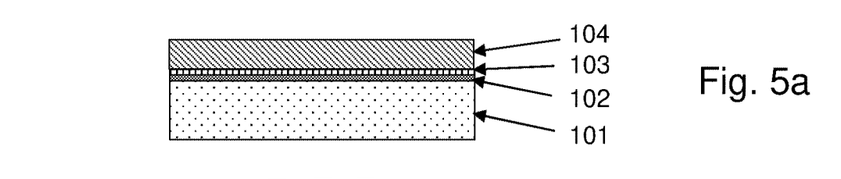
FIGS. 5a and 5b are schematic representations of a cross section (perpendicular to the direction R0) through a sensor element according to the invention, in which the measurement layer has no structuring on the underside, in a relaxed state (FIG. 5a) and in a state in which a force is exerted on the sensor element (FIG. 5b)
Figures 5B, 6A:
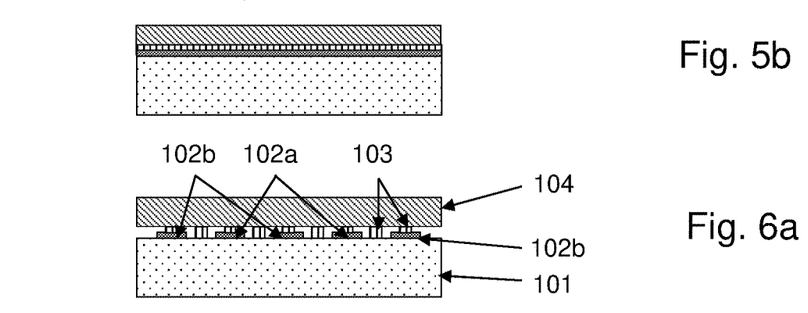
FIGS. 6a and 6b are schematic representations of a longitudinal section (in the direction R0) through the sensor element of FIGS. 5a and 5b in a relaxed state (FIG. 6a) and in a state in which a force is exerted on the sensor element (FIG. 6b)

FIGS. 5a and 5b are schematic representations of a cross section (perpendicular to the direction R0) through a sensor element 100 according to the invention, in which the measurement layer 104 has no structuring on the underside, in a relaxed state (FIG. 5a) and in a state in which a force is exerted on the sensor element (FIG. 5b).

Figure 6B:
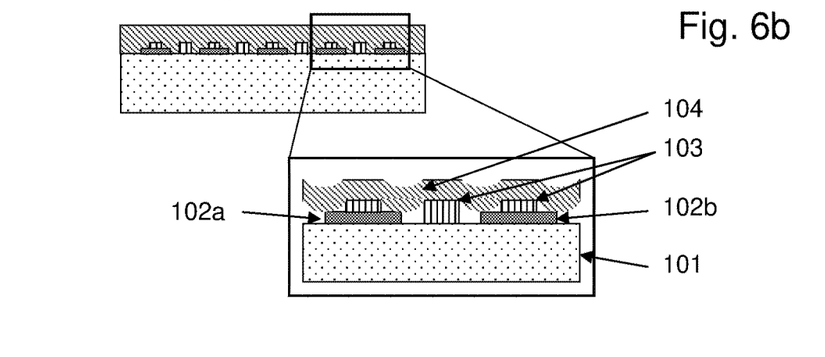

FIGS. 6a and 6b are schematic representations of a longitudinal section (in the direction R0) through the sensor element of FIGS. 5a, 5b in a relaxed state (FIG. 6a) and in a state in which a force is exerted on the sensor element (FIG. 6b).

Figure 7:
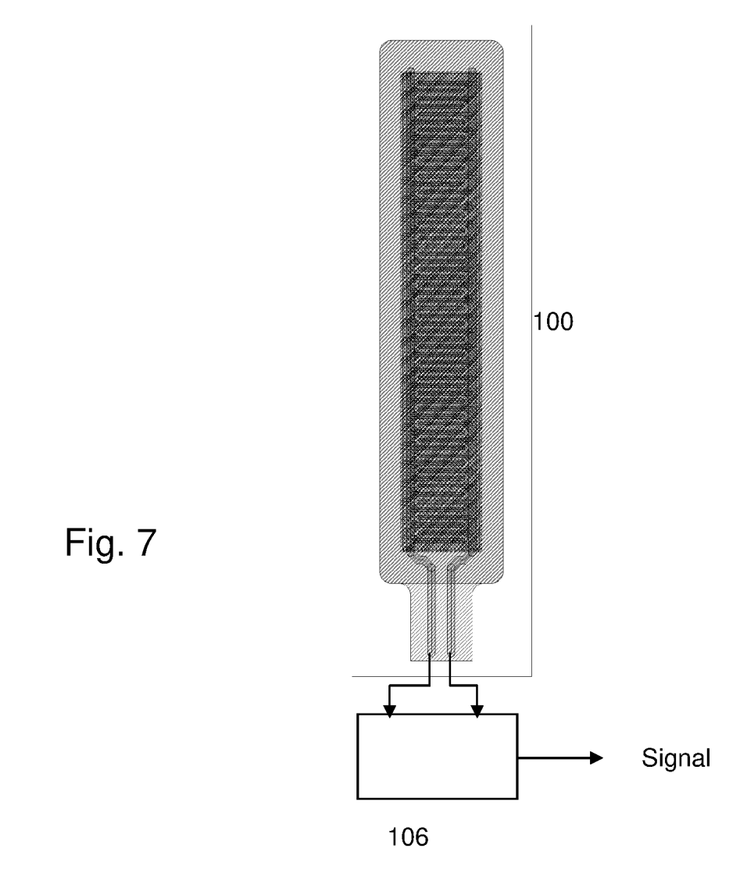
FIG. 7 shows a tactile sensor having a sensor element and having a control and evaluation module which is electrically connected to the electrode layer ES1 and the electrode layer ES2.

FIG. 7 shows a tactile sensor having a sensor element 100 and having a control and evaluation module 106 which is electrically connected to the electrode layer ES1 102a and the electrode layer ES2 102b. If the sensor element detects a tactile input, the control and evaluation module 106 generates a corresponding signal that is made available for further processing.

Even though the invention has been illustrated and explained in greater detail using preferred embodiments, the invention is not limited by the disclosed examples, and other variations can be derived therefrom by a person skilled in the art without departing from the scope of protection of the invention. It is therefore clear that there is a plurality of possible variations. It is also clear that embodiments mentioned by way of example actually only constitute examples that are not to be interpreted in any way as a limitation of the scope of protection, of the potential applications, or of the configuration of the invention. Instead, the preceding description and the description of the figures allow a person skilled in the art to specifically implement the embodiments, wherein a person skilled in the art, having knowledge of the disclosed inventive concept, is able to make numerous modifications, for example, with respect to the function or the arrangement of individual elements mentioned in an embodiment, without departing from the scope of protec-

LIST OF REFERENCE NUMERALS

100 Sensor element
101 Substrate layer
102a Electrode layer ES1
102b Electrode layer ES2
103 Spacer layer
104 Measurement layer
105 Protective layer

The invention claimed is:

1. A tactile sensor element comprising:
a substrate layer made of an electrically non-conductive material M1;
a first electrode layer ES1 applied onto an upper face of the substrate layer, and a second electrode layer ES2 applied onto the upper face of the substrate layer, wherein the first electrode layer ES1 and the second electrode layer ES2 consist of an electrically conductive material M2, are arranged on the upper face in a laterally spaced manner, and have respective 2D shapes designed such that sub-regions of the electrode layer ES1 and sub-regions of the electrode layer ES2 alternate successively multiple times at least in one region B on the upper face along a direction R0;
a spacer layer applied onto the substrate layer with the first electrode layer ES1 and the second electrode layer ES2 applied thereon, at least in the one region B, the spacer layer consisting of individual sections ST made of a substantially electrically non-conductive material M3, running in a direction R1 and mutually spaced, wherein the direction R1 and the direction R0 enclose an angle α, the angle α being in an angular range of 30°-60°, or at least in the one region B, the spacer layer consisting of a perforated grating made of the substantially electrically non-conductive material M3 with grating axes G1 and G2 running parallel to the upper face, wherein the direction R0 and one of the grating axes G1 or G2 enclose a second angle α, the second angle α being in an angular range of 30°-60°; and
a measurement layer applied onto the spacer layer, the measurement layer consisting of an electrically conductive elastic and stretchable material M4.

2. The sensor element according to claim 1, wherein the sub-regions of the first electrode layer ES1 and the sub-regions of the second electrode layer ES2 alternating along the direction R0 in the region B are each designed as projections, the projections interlocking in a comb-like manner.

3. The sensor element according to claim 1, wherein the sub-regions of the first electrode layer ES1 and the sub-regions of the second electrode layer ES2 arranged successively in the direction R0 have a corresponding distance from one another, wherein the corresponding distance is in a range of 0.01 mm to 5.0 mm.

4. The sensor element according to claim 1, wherein the sub-regions of the first electrode layer ES1 and the sub-regions of the second electrode layer ES2 arranged successively in the direction R0 have a corresponding longitudinal extension in the direction R0, wherein the longitudinal extension is in a range of 0.01 mm to 5.0 mm.

5. The sensor element according to claim 1, wherein the angle α=45°.

6. The sensor element according to claim 1, wherein the second angle α=45°.

7. The sensor element according to claim 1, wherein the spacer layer and the measurement layer are designed and set up in such a way that, when a force is applied onto the measurement layer, the measurement layer electrically contacts the sub-regions of the electrode layer ES1 and the sub-regions of the electrode layer ES2 that run between the sections ST or below the perforations of the perforated grating by elastic deformation.

8. The sensor element according to claim 1, wherein the measurement layer has a surface structuring on its side facing the spacer layer.

9. The sensor element according to claim 8, wherein the surface structuring has straight elevations arranged in parallel.

10. The sensor element according to claim 9, wherein the straight elevations arranged next to one another alternately have a rectangular and a triangular cross section.

11. The sensor element according to claim 9, wherein the straight elevations arranged next to one another each have a different elevation height H, the straight elevations with a rectangular cross section having an elevation height H1, and the straight elevations with a triangular cross section having an elevation height H2, where: H2≤H1.

12. The sensor element according to claim 2, wherein the projections are bar-like projections or jagged projections.

13. A tactile sensor comprising:
a sensor element comprising:
a substrate layer made of an electrically non-conductive material M1;
a first electrode layer ES1 applied onto an upper face of the substrate layer, and a second electrode layer ES2 applied onto the upper face of the substrate layer, wherein the first electrode layer ES1 and the second electrode layer ES2 consist of an electrically conductive material M2, are arranged on the upper face in a laterally spaced manner, and have respective 2D shapes designed such that sub-regions of the electrode layer ES1 and sub-regions of the electrode layer ES2 alternate successively multiple times at least in one region B on the upper face along a direction R0;
a spacer layer applied onto the substrate layer with the first electrode layer ES1 and the second electrode layer ES2 applied thereon, at least in the one region B, the spacer layer consisting of individual sections ST that made of a substantially electrically non-conductive material M3, running in a direction R1 and mutually spaced, wherein the direction R1 and the direction R0 enclose an angle α, the angle α being in an angular range of 30°-60°, or at least in the one region B, the spacer layer consisting of a perforated grating made of the substantially electrically non-conductive material M3 with grating axes G1 and G2 running parallel to the upper face, wherein the direction R0 and one of the grating axes G1 or G2 enclose a second angle α, the second angle α being in an angular range of 30°-60°; and
a measurement layer applied onto the spacer layer, the measurement layer consisting of an electrically conductive elastic and stretchable material M4; and
a control and evaluation module electrically connected to the first electrode layer ES1 and the second electrode layer ES2.

14. The tactile sensor according to claim 13, wherein the sub-regions of the first electrode layer ES1 and the sub-regions of the second electrode layer ES2 alternating along the direction R0 in the region B are each designed as projections, the projections interlocking in a comb-like manner.

15. The tactile sensor according to claim 14, wherein the projections are bar-like projections or jagged projections.

16. The tactile sensor according to claim 13, wherein the sub-regions of the first electrode layer ES1 and the sub-regions of the second electrode layer ES2 arranged successively in the direction R0 have a corresponding distance from one another, wherein the corresponding distance is in a range of 0.01 mm to 5.0 mm.

17. The tactile sensor according to claim 13, wherein the sub-regions of the first electrode layer ES1 and the sub-regions of the second electrode layer ES2 arranged successively in the direction R0 have a corresponding longitudinal extension in the direction R0, wherein the longitudinal extension is in a range of 0.01 mm to 5.0 mm.

18. The tactile sensor according to claim 13, wherein the angle $\alpha=45°$.

19. The tactile sensor according to claim 13, wherein the second angle $\alpha=45°$.

20. The tactile sensor according to claim 13, wherein the spacer layer and the measurement layer are designed and set up in such a way that, when a force is applied onto the measurement layer, the measurement layer electrically contacts the sub-regions of the electrode layer ES1 and the sub-regions of the electrode layer ES2 that run between the sections ST or below the perforations of the perforated grating by elastic deformation.

21. The tactile sensor according to claim 13, wherein the measurement layer has a surface structuring on its side facing the spacer layer.

22. The tactile sensor according to claim 21, wherein the surface structuring has straight elevations arranged in parallel.

23. The tactile sensor according to claim 22, wherein the straight elevations arranged next to one another alternately have a rectangular and a triangular cross section.

24. The tactile sensor according to claim 22, wherein the straight elevations arranged next to one another each have a different elevation height H, the straight elevations with a rectangular cross section having an elevation height H1, and the straight elevations with a triangular cross section having an elevation height H2, where: $H2 \leq H1$.

* * * * *